Patented May 29, 1951

2,555,137

UNITED STATES PATENT OFFICE 2,555,137

PHOSPHATIDE COMPOSITION

Sulo A. Karjala, Decatur, Ind., assignor to Central Soya Company, Inc., Fort Wayne, Ind., a corporation of Indiana No Drawing. Application June 11, 1947, Serial No. 754,059

2 Claims. (Cl. 252—1)

This invention relates to the preparation of phosphatide composition. The invention is particularly useful in the preparation of phosphatide products which may be mixed readily without loss in various food and industrial applications, while at the same time being stable against oil separation.

The commercial phosphatides now available consist of heavy viscous fluids or semi-solid plastic masses, with an acetone insoluble content of 63% to about 68%, the nominal standard in the industry being about 65%. The acetone insoluble content is a measure of the phosphatide content of the commercial phosphatides. The latter consist of a mixture of approximately 65% of phosphatides and 35% of oil. The phosphatides are insoluble in acetone, while the oil is soluble, and the extent of insolubility of commercial phosphatides in acetone gives a ready measure of the phosphatide content.

Phosphatides are used in many food and industrial applications, its use in most cases being of the order of 0.1% to 0.5%. Since such small amounts are required, its use is accompanied by considerable inconvenience, loss, and waste of phosphatide due to its high viscosity and tendency to stick to containers, paddles, scoops, and the like. Difficulty is encountered in attempts to weigh a given amount into a batch of food or industrial material.

An object of the present invention is to provide a product and process which will obviate the above difficulties. Yet another object is to provide a phosphatide composition which may be easily mixed without loss in food or industrial material, while at the same time providing a low viscosity mixture which is stable against oil separation. Yet another object is to provide a low viscosity phosphatide composition which is stable against oil separation and which is prepared by diluting commercial phosphatides or the like with vegetable oil and with the addition of small amounts of lactic acid and fatty acids to prevent separation of phosphatides and oil. Other specific objects and advantages will appear as the specification proceeds.

Phosphatides are found in practically all vegetable oils, the best and most economical source being soy bean oil. When crude soy bean oil is isolated from soy beans by hydraulic pressure or screw press methods, or by solvent extraction followed by elimination of the solvent by distillation and vacuum stripping, the oil is found to contain approximately 2% phosphatides on the average.

As long as the oil is dry, the phosphatides remain dissolved in the oil, but on standing in storage, water is absorbed by the oil. The water reacts with the phosphatides to form hydrated phosphatides, which differ essentially from the phosphatides by being insoluble in oil, and which separate as the well-known "foots," "settlings," or "tank bottoms." In this form, the precipitate decreases the value of the oil because of the oil losses which occur due to the presence of these tank bottoms during the refining of the oil.

It was discovered many years ago that if water were added to the crude oil obtained by expression or solvent extraction, the phosphatides could be hydrated and removed by settling or centrifugal methods to yield a high quality low-break oil on the one hand, and a valuable phosphatide on the other. The phosphatide isolated from vegetable oils generally contains a ratio of about two parts of phosphatide and one part of the parent oil, together with a widely varying amount of water, depending upon the amount of water which was used for the hydration of the phosphatides. The hydrated phosphatide is usually dried in a vacuum, the resultant product generally being a plastic solid or a highly viscous fluid at room temperature, containing about 65% phosphatides and 35% oil. The plasticity or fluidity appears in part to be a function of the moisture content of the final product. If the moisture content is below about 1%, the product is usually a heavy viscous fluid, while if it is above about 1% the product is usually a plastic solid. Phosphatides of low moisture content will readily absorb moisture, with the formation of a heavy plastic film over the surface of the fluid mass, the depth of the plastic layer being a function of the amount of moisture absorbed. When large amounts of moisture, in the neighborhood of 3–5%, are absorbed, the plastic product shows signs of bleeding of oil droplets to the surface.

All of these phenomena are believed to be due to the rapid reaction of the phosphatides with moisture, and the solubility of phosphatides in oil, together with the insolubility of hydrated phosphatides in oil. Commercial phosphatides then consist of approximately 65% of a mixture of phosphatides and hydrated phosphatides and 35% of parent oil, which is capable of dissolving the phosphatide but not the hydrated phosphatide, and the product will be a viscous fluid or a plastic solid, depending upon the relative amounts of the phosphatides and hydrated phosphatides present.

Several attempts have been made to prepare fluid phosphatide compositions by the addition of rather large amounts of fatty acids. For example, Karl Braun and R. Rosenbusch, U. S. Patent No. 2,168,468, claim a fluid phosphatide product containing 75–100 parts of commercial phosphatide, 3–50 parts of mixed castor oil fatty acids, and 2.5–10 parts of triethanolamine. Gustav Adolf Wiesehahn, U. S. Patent No. 2,194,842, claims a method for the addition of up to 20% of free fatty acids to commercial phosphatides. Josef Talalay, British Patent No. 445,534, describes a mixture of commercial phosphatides containing 25% of stearic, palmitic, or oleic acids for use in rubber compounding.

It is well known that dilution of the phosphatide mixture with vegetable oil has not been feasible because of the rapid tendency of the oil to separate on storage, particularly at temperatures below room temperature. The resultant product consists of an upper layer of oil saturated with phosphatides, and a lower viscous layer of phosphatides and hydrated phosphatides saturated with oil. This separation probably occurs in much the same way as the separation of phosphatides from crude oil on storage. The mass absorbs moisture from the atmosphere, and the moisture reacts with the phosphatides to form hydrated phosphatides. When the concentration of hydrated phosphatides exceeds the solubility of the hydrated material in the oil, separation occurs, the hydrated material drawing with it the major portion of the unhydrated phosphatides as well.

However, the use of large amounts of fatty acids is not a complete solution to the problem, for several reasons. Phosphatides, having a viscosity of over 100,000 centipoises at 80° F., will show a gradual drop in viscosity with increase in fatty acids to 15,000–20,000 centipoises at 80° F., when approximately 10% of fatty acid is added. Additional amounts of fatty acid cause no further decrease in viscosity, but actually cause an increase.

This product, with a viscosity of 15,000–20,000 centipoises at 80° F., is still too viscous for ready use. The flow rate is slow, and large amounts of material are retained on the sides of the container. Since most baking, chocolate and industrial uses for phosphatides call for its use in amounts of 0.1–0.5%, considerable inconvenience arises in its use due to the difficult handling problems.

Moreover, since the fatty acids are considerably more expensive than oil, the addition of large amounts of fatty acids gives rise to a more expensive product. The final product also has a high acidity, which makes it unsatisfactory for many applications.

I have discovered that a vegetable oil can be successfully used for lowering the viscosity of phosphatides, while at the same time rendering the product stable against oil separation through the use of small amounts of lactic acid and of fatty acids. As a specific example, a commercial phosphatide composition may be mixed with soy bean oil to lower the viscosity thereof to 3,000–7,000 centipoises at 80° F., while the oil separation is avoided by the addition of about 1–3% of lactic acid and about 2–3% of fatty acids. It will be understood that some variation in the ranges set out may be necessary depending upon the special properties desired in the final product. Ordinarily, the above low percentage of lactic acid and of fatty acids will be found satisfactory.

The lactic acid apparently forms a complex with the phosphatides in the presence of small amounts of fatty acids to give a product that remains in homogeneous solution or dispersion in the oil, even though amounts of moisture up to 2–3% are absorbed. This would appear to be the case since the product obtained on dilution of the phosphatides with oil becomes plastic when 1–3% of lactic acid is added without additional fatty acid. Moreover, only a small amount of the lactic acid can be recovered by aqueous extraction of the phosphatide.

The lactic acid may be the commercial 80% grade, 85% grade, or other high-quality material. Other aliphatic hydroxy acids may be used, such as glycolic acid, etc. Polybasic aliphatic hydroxy acids, such as malic, tartaric, and citric acids, may be also employed. Unusually effective results, however, have been obtained through the use of lactic acid.

Any of the common fatty acids may be used, such as lauric, palmitic, stearic, oleic, mixed soy bean oil fatty acids, or other individual or mixed aliphatic acids with carbon chains of 12 carbons or more. The low molecular weight aliphatic acids are undersirable because of their high volatility, odor, water solubility, and corrosiveness to iron equipment.

Any vegetable oil may be employed for the dilution of the product. I find that soy bean oil is particularly desirable. It may be crude oil or degummed oil. The degummed soy bean oil, which is oil from which the phosphatides have been removed, is preferable, and further is most readily obtainable in a phosphatide plant.

The order of addition of the various additives is unimportant. They may be mixed with the hydrated phosphatides in any order, or they may be added after partial drying, before or after bleaching, or just prior to final drying.

The use of lactic acid alone as an additive to phosphatides has been reported by Rewald in British Patent No. 464,100. However, he adds 20–50% of lactic acid with the specific aim of preparing a solid or plastic phosphatide composition, without the addition of soy bean oil or fatty acids, and, in fact, one of the claims pertains to the specific separation of a portion of the water associated with the phosphatide, while my specification shows the opposite, unexpected result of retaining absorbed moisture in continuous homogeneous phase with the phosphatides and oil. Thurman, in U. S. Patent No. 2,271,410, uses sodium lactate or free aliphatic hydroxy acids, but the composition formed is reported to be a "light-colored resin." No other additives are used, and the composition is not claimed to be a low viscosity phosphatide. Jordan, in U. S. Patent No. 2,193,873, claims the preparation of a water-dispersible lecithin by the addition of 10–15% of ethyl lactate. The purpose of this addition is to make the lecithin more readily emulsifiable in water, and has no relation to the invention described herein.

The hydrated phosphatide employed in the present invention as a starting point may be prepared by any suitable method. An unusually satisfactory method is that set out in the Kruse U. S. Patent No. 2,269,772. This product is preferred since it is low in moisture and has a more constant moisture content from one batch to the next, thus allowing more uniform production of the desired composition.

Specific examples of the process and composition may be set out as follows:

Example 1

A weighed amount of hydrated phosphatide, in the neighborhood of 550 pounds, is placed in a suitable mixer, warmed to 140–150° F., and mixed until the solid mass becomes homogeneous and fluid. A representative sample is removed and analyzed for moisture content and for acetone insoluble content. The product is then bleached if desired, after which 2% of commercial 80% lactic acid and 2% of oleic acid are added, based on the final weight of the mixture, followed by sufficient soy bean oil to give the resultant mixture an acetone insoluble content of 55%. The total amount of additives will depend upon the initial acetone insoluble content on the dry basis of the original hydrated phosphatides. If, for example, the above hydrated phosphatide contains 10% moisture and an acetone insoluble content of 65% on the dry basis, the 500 pounds of dry phosphatides will require the addition of 90 pounds of total additives to reduce the acetone insoluble content to 55%, and a total weight of final dried product of 590 pounds would be obtained. In this case, 11.8 pounds of 80% lactic acid, 11.8 pounds of oleic acid, and 66.4 pounds of soy bean oil would be added.

The resultant fluid product is then well mixed, and dried in a vacuum at 150–160° F. The product has a viscosity of 3,000–5,000 centipoises at 80° F. and an acetone insoluble content of 55%, and is remarkably stable against oil separation for long periods of time.

Example 2

A sample of hydrated phosphatides, which showed 8.0% moisture and 67.0% acetone insolubles on a dry basis, was isolated by the process indicated above, and 435 grams, representing 400 grams dry weight of phosphatides, was partially dried in a vacuum at 150° F. with efficient stirring until the mass was fluid. It was then bleached by known means at 150° F., after which 9.2 grams (2% of final weight) of commercial 80% lactic acid, 9.2 grams (2% of final weight) of stearic acid and 43.6 grams of soy bean oil were added. The product was dried in a vacuum at 150° F. until no further frothing occurred. The product at room temperature was a homogeneous low-viscosity fluid, with a viscosity of 5,000–7,000 centipoises at 80° F., and an acetone insoluble content of 58%. At low temperatures of 40–45° F., the viscosity increases, but no separation of oil occurs. The original low viscosity is again obtained when the material is brought to 80° F.

Example 3

A sample of hydrated phosphatides was partially dried in a vacuum and bleached by known methods. The bleached material was then re-dried to yield a product with 2.0% moisture and 67.44% acetone insoluble content on a dry basis. A total of 1,288 grams of this product was treated as in Example 2 with a mixture of 1% of commercial 80% lactic acid, 2% of oleic acid, and the required amount of soy bean oil to reduce the final acetone insoluble content to 56.0%. The product was a light yellow-brown, low-viscosity fluid. This material was allowed to stand in an open beaker, protected from dust, in order to allow the product to absorb moisture. The moisture content increased from the original value of 0.4–0.5% to 2.50% within 5 months, but no separation of oil and phosphatides occurred. On continued storage under these conditions for a period of 14 months, no separation of oil occurred, indicating the composition to be stable indefinitely, even under adverse conditions of moisture absorption.

While in the foregoing specification, I have set forth certain steps in considerable detail for the purpose of illustrating the invention, it will be understood that the details thereof may be modified widely by those skilled in the art without departing from the spirit of my invention.

I claim:

1. As a new composition of matter, a soy bean phosphatide and oil composition of low viscosity at room temperature and stable toward oil separation, consisting of 55–60% phosphatides, 1–3% lactic acid, 2–3% high molecular weight fatty acids, and 34–42% of semi-drying oil.

2. As a new composition of matter, a phosphatide and oil composition of low viscosity at room temperature and stable toward oil separation, consisting of 55–60% phosphatides, 1–3% lactic acid, 2–3% high molecular weight fatty acids, and 34–42% of soy bean oil.

SULO A. KARJALA.

REFERENCES CITED

The following references are of record in the file of this patent:

UNITED STATES PATENTS

| Number | Name | Date |
|---|---|---|
| 2,194,842 | Wiesehahn | Mar. 26, 1940 |
| 2,264,593 | Schapiro | Dec. 2, 1941 |
| 2,271,410 | Thurman | Jan. 27, 1942 |
| 2,402,690 | Stanley | June 25, 1946 |

FOREIGN PATENTS

| Number | Country | Date |
|---|---|---|
| 464,100 | Great Britain | Apr. 8, 1937 |

OTHER REFERENCES

The Spic Mill, May 1927, article by Iszard, "The Value of Lactic Acid," pp. 950–956.